(12) United States Patent
Hill

(10) Patent No.: US 9,707,821 B2
(45) Date of Patent: Jul. 18, 2017

(54) VENTILATION SYSTEM FOR A POWER MACHINE

(75) Inventor: Aaron G. Hill, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 968 days.

(21) Appl. No.: 13/805,854

(22) PCT Filed: Mar. 8, 2012

(86) PCT No.: PCT/US2012/028217
§ 371 (c)(1),
(2), (4) Date: May 9, 2013

(87) PCT Pub. No.: WO2012/125394
PCT Pub. Date: Sep. 20, 2012

(65) Prior Publication Data
US 2013/0344792 A1    Dec. 26, 2013
US 2016/0332500 A9    Nov. 17, 2016

Related U.S. Application Data

(60) Provisional application No. 61/451,712, filed on Mar. 11, 2011.

(51) Int. Cl.
*B60H 1/00* (2006.01)

(52) U.S. Cl.
CPC ..... *B60H 1/00028* (2013.01); *B60H 1/00207* (2013.01); *B60H 1/00378* (2013.01); *B60H 1/00564* (2013.01); *B60H 2001/00099* (2013.01)

(58) Field of Classification Search
None
See application file for complete search history.

(56) References Cited

U.S. PATENT DOCUMENTS 2,347,141 A    4/1944  Werdehoff
2,551,528 A    5/1951  Darrin
(Continued)

FOREIGN PATENT DOCUMENTS

CN    101065261 A    10/2007
CN    201240243 Y    5/2009
(Continued)

OTHER PUBLICATIONS

Search Report and Written Opinion dated May 30, 2012 for International Application No. PCT/US2012/028217, filed Mar. 8, 2012, 12 pages.
(Continued)

*Primary Examiner* — Gregory Huson
*Assistant Examiner* — Eric Gorman
(74) *Attorney, Agent, or Firm* — John D. Veldhuis-Kroeze; Westerman, Champlin & Koehler, P.A.

(57) ABSTRACT

A ventilation system for a power machine is disclosed. The ventilation system includes a first ductwork section and a second ductwork section. An intermediate unsealed cavity is positioned between the first ductwork section and the second ductwork section. A source of air having a primary fan is provided. The source moves air through the first ductwork section into an intermediate cavity. A secondary fan draws air from the intermediate cavity, re-pressurizes the air, and forces the air out of the second ductwork section.

8 Claims, 5 Drawing Sheets

(56) References Cited

U.S. PATENT DOCUMENTS

| | | | |
|---|---|---|---|
| 2,664,308 A | 12/1953 | Appel | |
| 2,696,774 A | 12/1954 | Bayley | |
| 3,555,846 A | 1/1971 | Harbeck et al. | |
| 3,776,358 A * | 12/1973 | Williams | B60H 1/00378 15/250.01 |
| 3,919,926 A | 11/1975 | Yamada | |
| 4,026,349 A | 5/1977 | Schaap | |
| 4,035,018 A | 7/1977 | Erbele et al. | |
| 4,088,364 A | 5/1978 | Termont | |
| 4,120,527 A | 10/1978 | Lawrence | |
| 4,365,541 A * | 12/1982 | Marques et al. | B60H 3/0616 454/139 |
| 4,512,239 A | 4/1985 | Watanabe et al. | |
| 4,531,453 A | 7/1985 | Warman et al. | |
| 4,612,975 A | 9/1986 | Ikari | |
| 5,308,279 A * | 5/1994 | Grinberg | B60H 1/00378 454/139 |
| 5,450,894 A * | 9/1995 | Inoue et al. | B60H 1/00285 165/43 |
| 5,673,964 A * | 10/1997 | Roan et al. | B60H 1/00028 296/208 |
| 5,873,256 A * | 2/1999 | Denniston | B60H 1/00414 62/244 |
| 5,921,619 A | 7/1999 | Cederberg et al. | |
| 6,126,539 A | 10/2000 | Miller et al. | |
| 6,223,807 B1 | 5/2001 | Asche et al. | |
| 6,502,897 B2 | 1/2003 | Neuss et al. | |
| 6,620,039 B1 * | 9/2003 | Tao et al. | B60H 1/00378 454/139 |
| 6,877,787 B2 | 4/2005 | Ito et al. | |
| 7,303,714 B2 | 12/2007 | Matsuzaki et al. | |
| 7,334,834 B2 | 2/2008 | Hill et al. | |
| 7,900,996 B2 | 3/2011 | Kimura et al. | |
| 9,126,643 B2 * | 9/2015 | Nagami et al. | E02F 9/163 |
| 9,139,979 B2 * | 9/2015 | Nagami et al. | E02F 3/7609 |
| 2002/0189874 A1 * | 12/2002 | Sato et al. | B60R 16/0239 180/65.8 |
| 2004/0104578 A1 * | 6/2004 | Wurtele | B60H 1/00378 290/1 A |
| 2005/0211483 A1 * | 9/2005 | Pfohl et al. | B60K 11/04 180/68.1 |
| 2006/0131885 A1 * | 6/2006 | Wurtele | B60H 1/00378 290/1 A |
| 2007/0144463 A1 * | 6/2007 | Keane et al. | F01P 5/06 123/41.29 |
| 2007/0295017 A1 * | 12/2007 | Pannell | B60H 1/00364 62/236 |
| 2008/0108032 A1 * | 5/2008 | Tuhy et al. | E02F 9/226 434/245 |
| 2009/0266632 A1 * | 10/2009 | Hill et al. | B60K 1/02 180/68.1 |
| 2010/0068983 A1 * | 3/2010 | Williams | B60K 6/46 454/184 |
| 2011/0214403 A1 * | 9/2011 | Geiss et al. | B60H 1/00378 55/478 |
| 2011/0241379 A1 * | 10/2011 | Obe et al. | B60H 1/00378 296/190.09 |
| 2011/0241380 A1 | 10/2011 | Mayr et al. | |
| 2011/0250832 A1 * | 10/2011 | Mayr et al. | B60H 1/00378 454/237 |
| 2011/0252756 A1 * | 10/2011 | Geiss et al. | B60H 1/00378 55/478 |
| 2014/0027090 A1 * | 1/2014 | Morikawa et al. | B60H 1/00828 165/47 |
| 2014/0034266 A1 * | 2/2014 | Tabei; Koichi | B60H 1/00764 165/42 |
| 2014/0194048 A1 * | 7/2014 | Wittmann et al. | B60H 1/0005 454/139 |

FOREIGN PATENT DOCUMENTS

| | | |
|---|---|---|
| CN | 201257885 Y | 6/2009 |
| DE | 10029211 A1 | 12/2001 |
| DE | 102007044466 A1 | 3/2009 |
| EP | 1323555 A1 | 7/2003 |
| EP | 2135758 B1 | 9/2010 |
| JP | S6088626 A | 5/1985 |
| WO | 2010066877 A1 | 6/2010 |

OTHER PUBLICATIONS

Chinese Office Action and English Translation dated Dec. 30, 2015 for Chinese Application No. 201280001878.6, 6 pages.

Chinese Office Action dated Apr. 27, 2015 with English translation for corresponding Chinese Application No. 20128001878.6, 8 pages.

Chinese Office Action dated Jul. 16, 2015 with English translation for corresponding Chinese Application No. 20128001878.6, 6 pages.

European Office Action dated Mar. 30, 2017 for European Application No. 12709258.3, 4 pages.

* cited by examiner

VENTILATION SYSTEM FOR A POWER MACHINE

CROSS-REFERENCE TO RELATED APPLICATION

This Application is a Section 371 National Stage Application of International Application No. PCT/US2012/028217, internationally filed on Mar. 8, 2012 and published as WO2012/125394 on Sep. 20, 2012, in English; which claims priority to U.S. Provisional Patent Application No. 61/451,712, filed on Mar. 11, 2011, the contents of which are hereby incorporated by reference in their entireties.

BACKGROUND

The present disclosure relates to a heating, ventilating, and air conditioning system (HVAC) of a power machine and associated routing of air into a cab of the power machine.

Power machines include various work vehicles such as skid steer loaders, tracked loaders, excavators, telehandlers, and utility vehicles. Various power machines include cabs that protect the operator of the power machine and define, or help to define with a frame of the power machine, an operator compartment in which an operator is positioned while operating the power machine. Enclosed cabs provide the option for providing the operator climate controlled working conditions with heating, ventilating, and air conditioning (HVAC) systems. However, due to limited space and general construction of operator cabs in power machines, generation and distribution of conditioned air can be challenging. For example, some power machines such as skid steer loaders are very compact, and it is desirable to keep the profile, that is the height, width, and length outside dimensions, the same, with or without an HVAC system for each model. Other power machines present similar challenges.

U.S. Pat. No. 6,223,807, issued to Asche et al. on May 1, 2001, discloses an HVAC system which aids overcoming some of the above-described challenges by choice of HVAC system position and configuration. However, limitations of space available for routing ducts can still present further challenges in some power machine configurations. For example, side panels or walls of the operator cab are frequently subject to internal geometry effecting constrains such as the requirement for routing wires, requirements to maximize interior space of the cab, etc. As a result, it can be difficult to provide sufficient room for ducts through which the HVAC system moves air to remote locations of the cab.

SUMMARY

The present disclosure relates to a heating, ventilating and air conditioning (HVAC) system for a power machine. More particularly, a ventilation system is provided in which air is moved from a duct of the HVAC system, through a side panel or other power machine cab component, without a closed duct in the side panel or cab component. The ventilation system includes a first ductwork section and a second ductwork section. An intermediate unsealed cavity is positioned between the first ductwork section and the second ductwork section. The HVAC system further includes a source of air with a primary fan that moves air through the first ductwork section into an intermediate cavity. A secondary fan draws air from the intermediate cavity, re-pressurizes the air, and forces the air out of the second ductwork section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Before any embodiments of the present disclosure are explained in detail, it is to be understood that the concepts disclosed herein are not limited in their application to the details of construction and the arrangement of components set forth in the following description or illustrated in the following drawings. Rather, the disclosed concepts are capable of being practiced or carried out in various other embodiments. The phraseology and terminology used herein is for the purpose of description and should not be regarded as limiting. Words such as "including," "comprising," and "having" and variations thereof as used herein is meant to encompass the items listed thereafter, equivalents thereof, as well as additional items. Unless specified or limited otherwise, the terms "mounted," "connected," "supported," and "coupled" and variations thereof are used broadly and encompass both direct and indirect mountings, connections, supports, and couplings.

Space is limited for placement of ductwork to move treated or conditioned air (e.g., filtered and/or heated or cooled) from an HVAC system in some power machines to remote areas of an operator compartment. For example, with an HVAC system located behind a cab, it is frequently desirable to move treated air to the lower front foot area of the operator compartment. Due to the packaging of cab components, available space, and operator compartment limitations, there may not be sufficient available room for conventional ductwork to be used over the entire distance that the air must be moved. Ductwork tooling is frequently expensive and complex. Making space for a duct can have negative impacts such as the potential need to eliminate a rear storage compartment or other features in the operator compartment and the potential required geometry changes and relocation of a number of components in side console(s) or other components in the operator compartment. Additionally, circumstances can result in the ducts being very restricted in size, rendering it difficult to supply enough treated air to the desired location, for example the foot area of the operator compartment.

Figure 1:
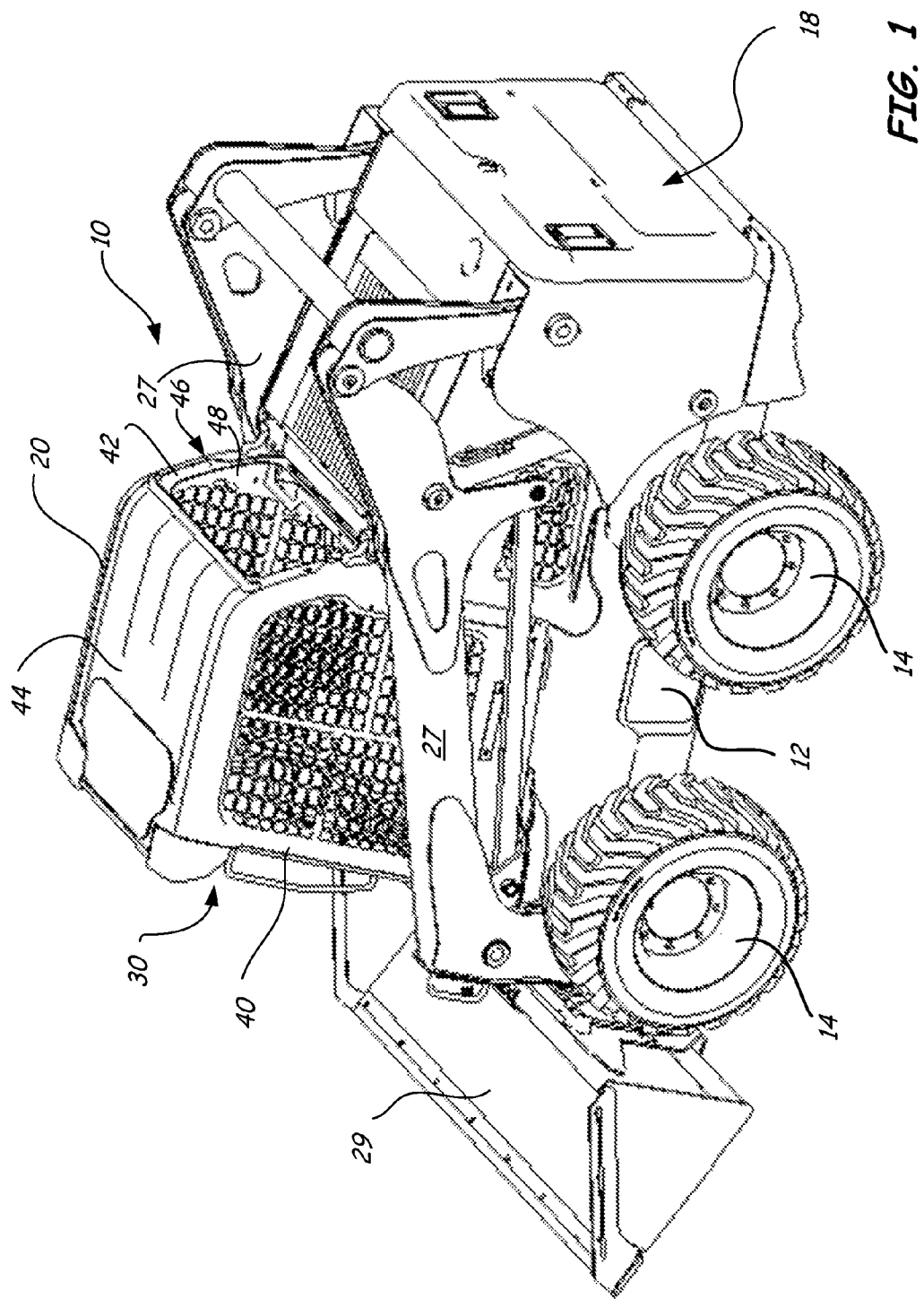
FIG. 1 is a schematic perspective view of one example embodiment of a power machine having a ventilation system that moves air from a heating, ventilating and air conditioning system (HVAC) through panels located within an operator compartment.
Figure 2:
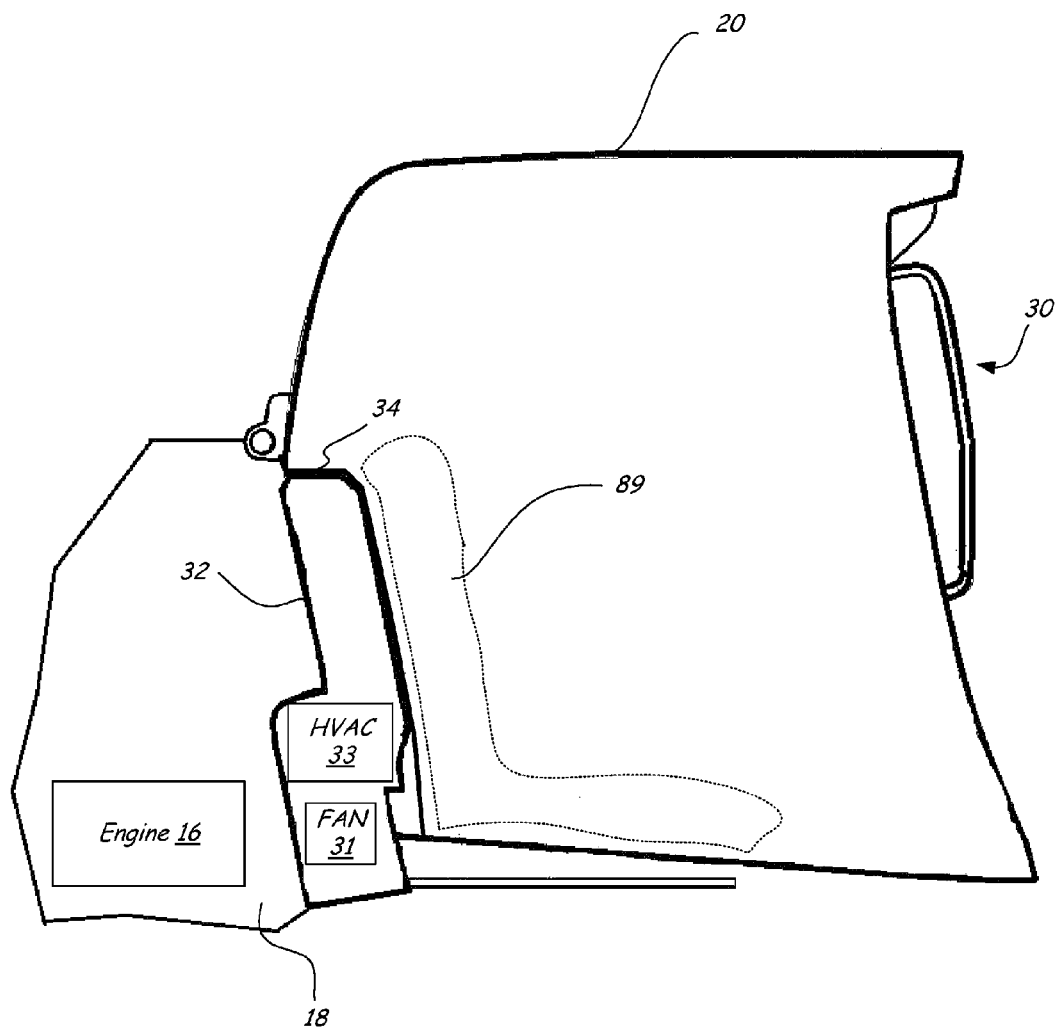
FIG. 2 is a diagrammatic side sectional view of portions of the power machine shown in FIG. 1.

Referring to FIGS. 1 and 2, a power machine 10, in the form of a skid steer loader, is illustrated as an exemplary embodiment of a machine in which the ventilation system of the present disclosure is used. However, the disclosed embodiments are not limited to use of the ventilation system in a skid steer loader, but rather, the concepts discussed in the disclosed embodiments can be incorporated into a ventilation system any power machine. For example, the disclosed ventilation system can be used, in other embodiments, in power machines such as tracked loaders, excavators, telehandlers, and utility vehicles.

In the exemplary embodiment, power machine 10 includes a frame 12, supported by wheels 14 that are driven by a suitable power train (not shown). The power train can include hydraulic motors that are driven by a hydraulic power supply. Instead of wheels, tracks can be used as tractive elements in a tracked loader embodiment. The hydraulic power supply, which in one embodiment includes tandem hydrostatic pumps, are driven by an engine 16 (shown in FIG. 2) mounted in an engine compartment 18 (the location of which is generally shown in FIG. 1) that is located within the frame 12 and is generally reward of a cab or operator enclosure 20, which is supported on the frame 12. The loader has pivoting arms 27 that can be raised and lowered under power. A loader bucket or other implement or attachment 29 is supported by the arms 27.

In this exemplary embodiment, the cab 20, along with portions of the frame 12, define and enclose an operator compartment 30. In other power machines, however, the cab may define the entire operator compartment. Cab 20 has a pair of opposing side walls 40 and 42, a roof 44, and a rear portion 46, including a rear window 48 and a back wall 34 (shown in FIG. 2). On a front side of the power machine, the cab 20 has an aperture (not shown in FIG. 1, which allows for entry into and exit from the operator compartment 30, which is generally defined as a space enclosed by the side walls 40 and 42, roof 44, rear portion 46, and back wall 34. In addition, the operator compartment 30 may extend beneath the cab 20 and within a portion of the frame 12 of the power machine. In some embodiments, a door (not shown in FIG. 1 is pivotally attached to the cab so that when rotated into a closed position, the entry and exit aperture is covered or substantially covered.

The side walls 40 and 42 of the cab 20 are shown as being made of side plates (preferably steel) with a plurality of apertures formed therethrough. In addition, transparent windows can be attached to the side plates. Alternatively still, the side walls 40 and 42 may not have the pattern of apertures shown in FIG. 1, but instead can have a large aperture which is covered by a transparent window. When the cab 20 is equipped with a door and windows are attached to the side walls 40 and 42, the operator compartment is generally enclosed. An operator seat 89 is positioned in the operator compartment 30 and is shown outlined in dotted lines in FIG. 2. A heating, ventilating, and air conditioning (HVAC) system including a system housing indicated generally at 32 (shown in FIG. 2) is installed along the back wall 34 of the cab 20 adjacent the engine compartment 18 to provide treated air into the operator compartment 30. HVAC system housing 32 houses a source of treated air in the form of an HVAC system 33. A primary HVAC system fan 31 is included to force conditioned air through one or more ducts into the operator compartment 30 as will be discussed in more detail below. HVAC system 33 can, in exemplary embodiments, be configured in accordance with the HVAC system disclosed in U.S. Pat. No. 6,223,807, issued to Asche et al. on May 1, 2001. However, the present disclosure further allows for the distribution of HVAC system conditioned air to areas such as a lower forward portion of the operator compartment 30 without the use of a continuous duct to the area, for example, a duct that is positioned along sides of the operator compartment. Disclosed embodiments are not limited to the particular HVAC system housing and/or engine compartment configurations illustrated. Instead, these illustrations are provided as a non-limiting example.

Figure 3:
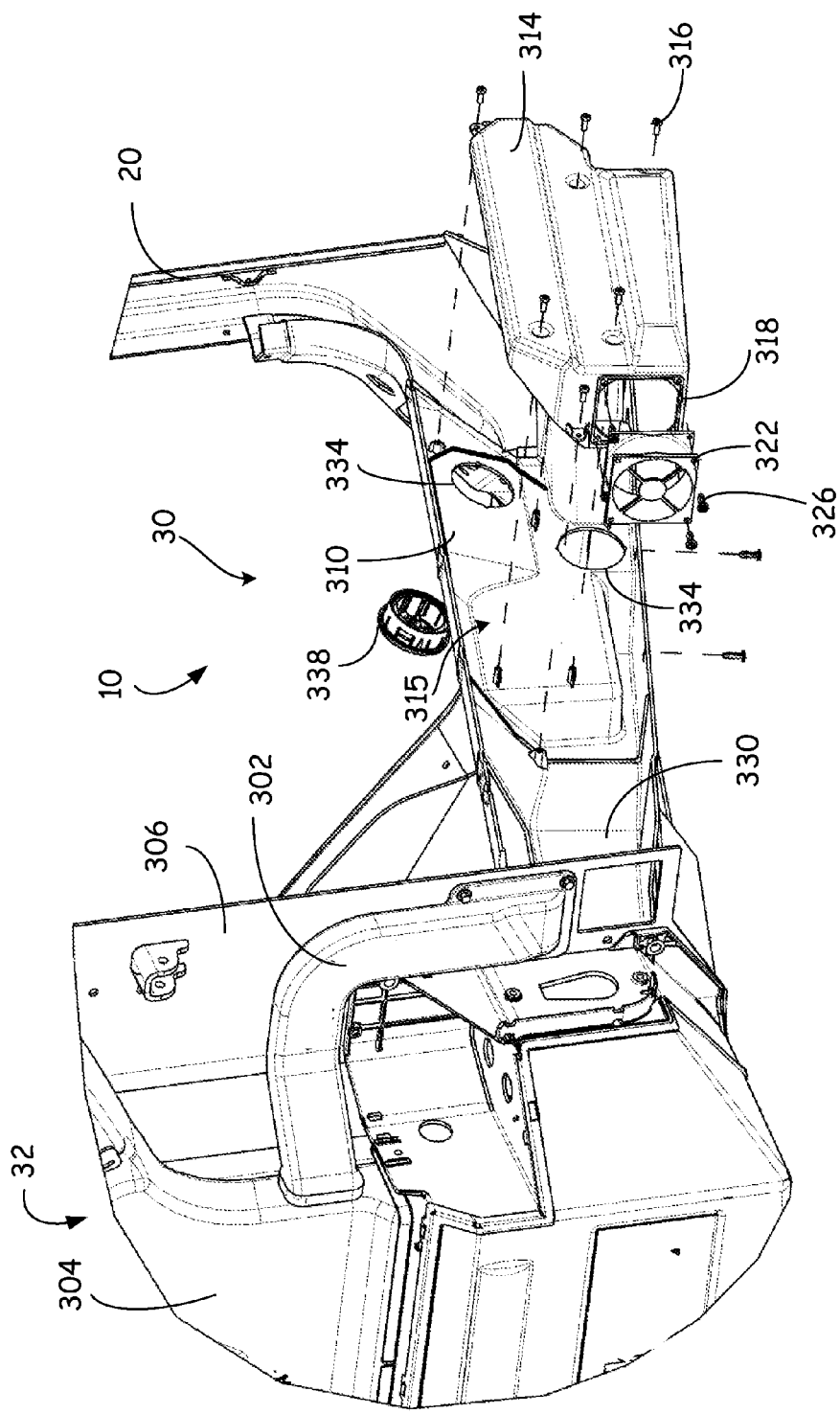
FIG. 3 is a partially exploded rear perspective view of a portion of the power machine shown in FIG. 1 that illustrates features of the ventilation system in accordance with an example embodiment.

Referring now to FIG. 3, shown is a partially exploded rear perspective view of a portion of power machine 10 including portions of cab 20, which illustrates features of a ventilation system in accordance with exemplary embodiments. As shown in FIG. 3, a main duct 304 is coupled to or integrated with HVAC housing 32. Main duct 304 receives treated air from the HVAC system 33 and supplies the air into the operator compartment 30, for example, through a back panel 306, which is, in some embodiments, the back wall 34 shown in FIG. 2. A first ductwork section 302, smaller in cross-sectional area than the main duct is coupled to main duct 304 and allows flow of treated air therethrough, at least partially under the influence of primary fan 31. First ductwork section 302 communicates with or extends through an aperture 402 (shown in FIG. 4) in back panel 306 to allow treated air to flow through the back panel 306 via aperture 402.

FIG. 3 also includes a panel or side console 310 of the cab 20 that extends along a side of the cab 20 and is positioned against and, in some embodiments, secured to, one or the other of side walls 40 and 42. Side console 310 is sometimes referred to as a fender panel. The illustrated side console 310 is a right hand console from a seated operator's perspective and is configured to be positioned against side wall 42, although side wall 42 is not shown in FIG. 3. The view of side console 310 is an interior view thereof from outside of the cab 20, and the operator compartment perspective is opposite from the illustrated view. Side console 310 provides protection for numerous components such as wire harnesses, throttle cables, harness brackets that are routed through the operator compartment as well as fasteners for the window assembly and the like, none of which are shown in FIG. 3. The necessary geometry or structure behind the side console 310 can leave little or no room for a closed duct system between first ductwork section 302 and the forward foot area of the operator compartment.

Disclosed embodiments overcome the duct limitations and the geometry from existing parts by eliminating the need for a closed duct through the side console 310. With treated air pulled from the main duct 304 coming out of the HVAC system, the air is routed into the lower rear of the cab through the first ductwork section 302. The treated air from the HVAC system is then dumped into an intermediate cavity 330 forward of back panel 306 and in a rearward portion of the side console 310. This interior space or intermediate cavity 330 is defined by a side wall of the cab 20 and an interior component such as console 310. Intermediate cavity 330, although generally enclosed by a side wall and the side console is not an enclosed duct in that it has a much larger cross-sectional area than first ductwork section 302 and is not a sealed compartment. As discussed above, harnesses, cables, and the like are routed through the cavity 330. In addition, a storage compartment is configured to fit into the cavity 330. The result is that although there is a fairly large cross-sectional area in intermediate cavity 330, it is very difficult to route a hard duct through the volume in the intermediate cavity 330 and a soft duct is susceptible to being crushed. In addition, the obstructions in the intermediate cavity 330 impede air flow therethrough, so that without a sealed duct, air loses momentum and tends to stall out.

A shield 314 is secured to side console 310 with screws or other fasteners 316 to create a second ductwork section in the form of a plenum 315 between the shield 314 and the side console 310 on the opposing side of the intermediate cavity 330 from back panel 306. The shield 314 illustratively includes an opening or aperture 318 configured to receive a secondary fan 322, which is mounted to the shield with screws or other fasteners 326. The plenum 315 is completely sealed except for the fan which is the inlet to re-pressurize the air. In an exemplary embodiment, secondary fan 322 is a compact high speed fan that allows for remote placement, while providing excellent air flow and pressure rise characteristics. These fans vary in size from 20 mm to 200 mm, and in one exemplary embodiment an 80 mm fan is used. Secondary fan 322 pulls the treated air forward from intermediate cavity 330, and the air is pressurized inside of the plenum 315. Pressurized air is then directed out of the plenum 315 via apertures 334, which are illustratively covered by actuable louvers 338 therein. Manipulation of the louvers 338 can block air from exiting one or more apertures 334 or alternatively, can direct air flow, for example, into the foot area of the operator compartment 30. In an example embodiment, the louvers 338 are 70 mm round louvers, but other louver sizes and shapes can be used. The air is pushed by the main HVAC fan 31 via the first ductwork section 302, while a secondary fan 322 positioned behind the side console 310 pulls the air forward through the geometry. Without the secondary fan, the air would stall in the cavity because of the reasons discussed above, and therefore, there would not be sufficient air flow to the apertures 334. The plenum allows for multiple apertures 334 to be used in an exemplary embodiment, but the secondary fan can also be directly connected to a single aperture 334. Also, multiple secondary fans can be used in plenum 315 to push air through multiple apertures. While the exemplary disclosed embodiment utilizes a single fan, a single plenum, and two louver covered apertures, other embodiments are within the scope of the present disclosure.

Figure 4:
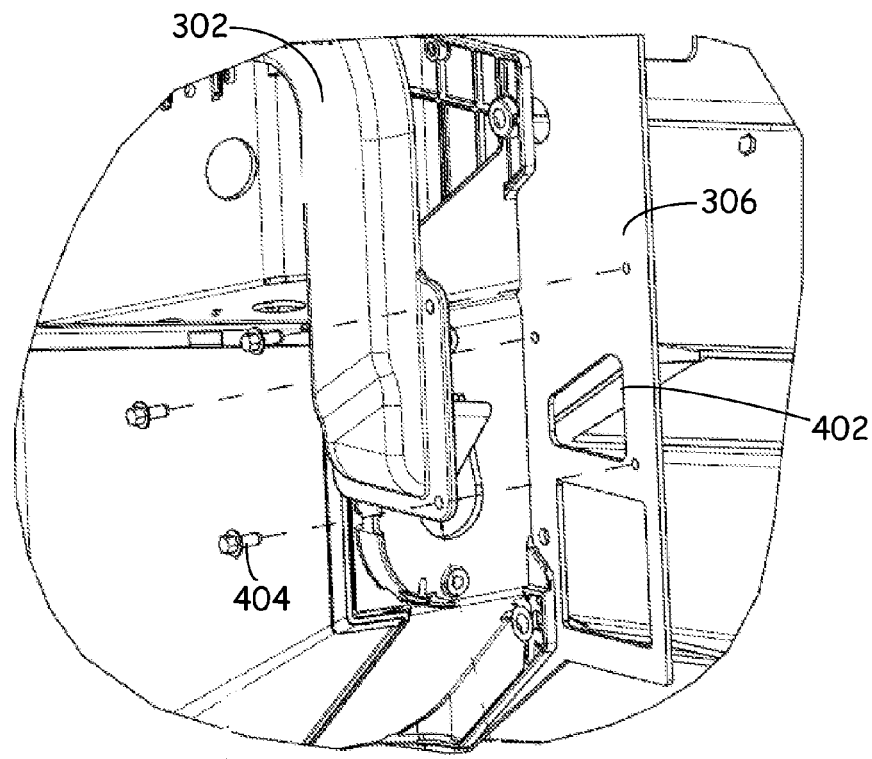
FIG. 4 is a partially exploded perspective view of a portion of the power machine shown in FIG. 1 illustrating further features in greater detail.
Figure 5:
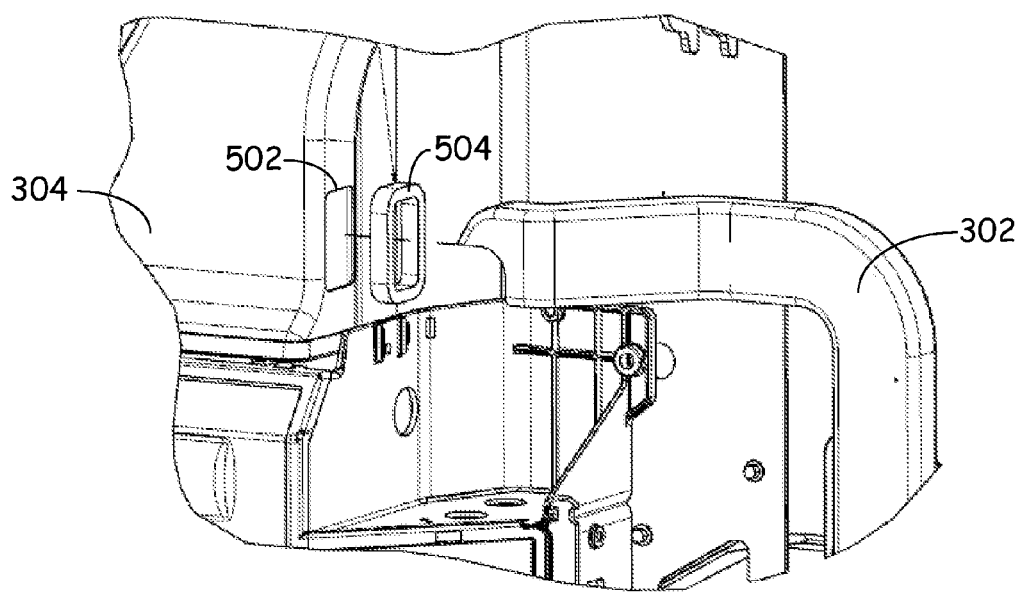
FIG. 5 is a partially exploded perspective view of a portion of the power machine shown in FIG. 1 illustrating further features in greater detail.

Referring now to FIG. 4, shown is a portion of power machine 10 where the first ductwork section 302 attaches to back panel 306 over aperture 402 in the back panel. Attachment is made using screws or other fasteners 404. Referring to FIG. 5, shown is a portion of power machine 10 where the first ductwork section 302 attaches to main duct 304 at an aperture or duct opening 502. The first ductwork section 302 is illustratively shown in exploded view. A seal 504 is also used at the connection between ducts 302 and 304 to prevent loss of air and pressure.

Figure 6:
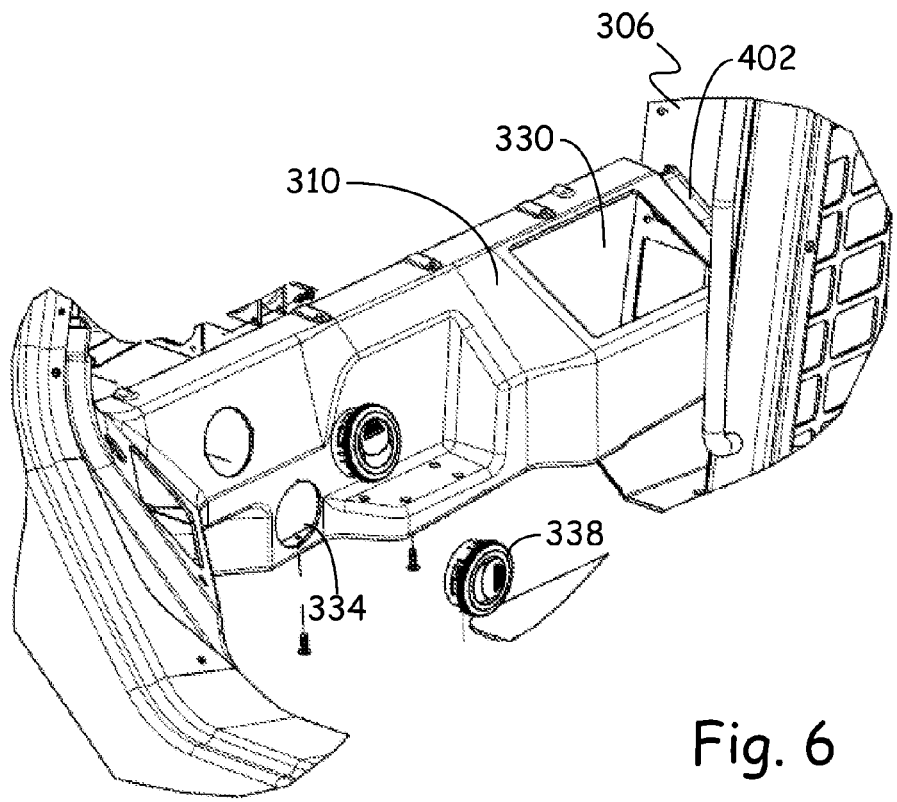
FIG. 6 is a partially exploded view of a portion of an interior of the cab shown in FIG. 1 which illustrates further features of the ventilation system in greater detail.
Figure 7:
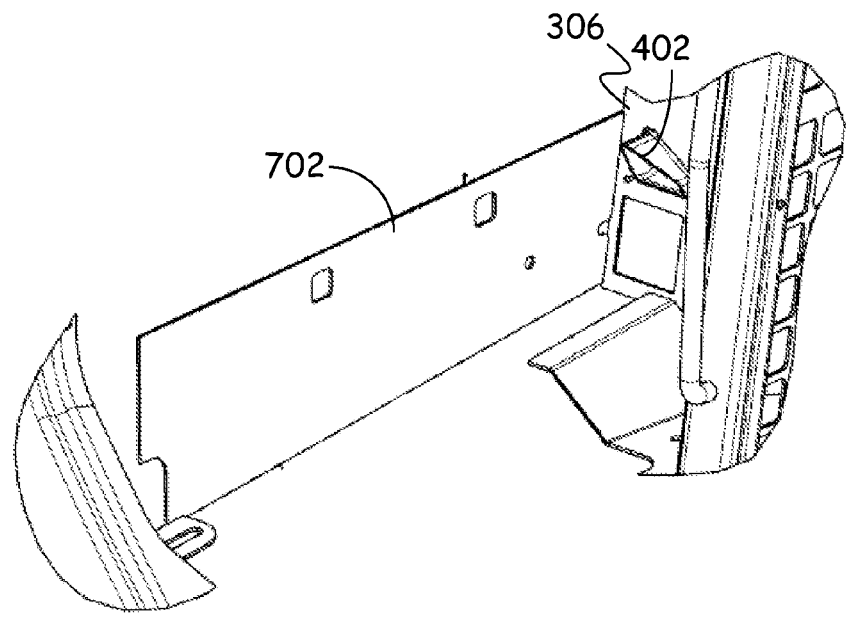
FIG. 7 is an illustration of components of the interior of the cab shown in FIG. 6.

FIG. 6 is a perspective view from inside of cab 20 of side panel 310. Louvers 338 and apertures 334 into which the louvers are mounted are shown. Also shown is rear panel 306 of the cab 20, and aperture 402 through which first ductwork section 302 provides the treated air into intermediate cavity 330. Insulators are used to isolate the treated air from the ambient conditions outside the cab to maintain the temperature of the treated air while it travels outside of the first ductwork section 302. In one exemplary embodiment, a single insulator sheet 702 is used to shield the air from the cab wall which conducts the outside air temperature, but more insulators could be used in other embodiments. The insulator sheet 702 is shown in FIG. 7, from the same perspective view as shown in FIG. 6 but with side console 310 removed.

It must be understood that, while in the example embodiment disclosed concepts and features are used to push/pull conditioned or treated air from an HVAC system duct through a side panel of a power machine without the use of a fully enclosed duct through the side panel, other embodiments are also within the scope of the disclosure. For example, in another embodiment where an HVAC system is positioned to route air into the lower part of the cab, the disclosed concepts can be employed to route air through a headliner or other cab structure in which there is insufficient room for an enclosed duct. Use of a secondary fan to pull/push air through a cab wall or other geometry and to re-energize the air for blowing through louvers can be implemented in a variety of different ways.

Although concepts of the present disclosure have been described with reference to preferred embodiments, workers skilled in the art will recognize that changes may be made in form and detail without departing from the spirit and scope of the disclosure.

What is claimed is:

1. A power machine comprising:
   a frame;
   an operator enclosure supported on the frame;
   a heating, ventilating, and air conditioning (HVAC) system positioned in an HVAC housing supported on the frame and having a primary fan, the HVAC system configured to treat air;
   a first ductwork section, the first ductwork section arranged downstream of an HVAC housing outlet such that the first ductwork section receives treated and pressurized air from the HVAC system under power from the primary fan;
   a second ductwork section;
   an intermediate cavity defined by a structure positioned within the operator enclosure, the intermediate cavity being positioned between the first ductwork section and the second ductwork section such that the pressurized air from the first ductwork section is moved into the intermediate cavity, the intermediate cavity having a larger cross section than both of the first ductwork section and the second ductwork section; and
   a secondary fan for drawing and re-pressurizing air from the intermediate cavity into the second ductwork section and forcing the re-pressurized air through the second ductwork section.

2. The power machine of claim 1, wherein the first ductwork section is connected to the HVAC system through a main duct, and to the intermediate cavity defining structure through a back panel of the operator enclosure.

3. The power machine of claim 1, wherein the intermediate cavity defining structure houses an unsealed volume of air between the first ductwork section and the second ductwork section.

4. The power machine of claim 1, wherein the second ductwork section comprises a plenum having an inlet aperture through which the air enters the plenum from the intermediate cavity, wherein the secondary fan is mounted in the inlet aperture.

5. The power machine of claim 4, wherein the plenum is formed between an interior side panel of the operator enclosure and a shield attached to the interior side panel.

6. The power machine of claim 5, wherein the intermediate cavity defining structure comprises a portion of a back panel of the operator enclosure and a portion of the interior side panel of the operator compartment.

7. The power machine of claim 6, and further comprising an insulator which insulates at least one of the intermediate cavity and the second ductwork section.

8. The power machine of claim 6, and further comprising:
   an outlet aperture of the plenum formed in the interior side panel of the operator enclosure; and
   a louver mounted in the outlet aperture to control movement of the re-pressurized air from the plenum into the operator enclosure of the power machine.

\* \* \* \* \*